United States Patent [19]

Pike

[11] Patent Number: 4,605,995
[45] Date of Patent: Aug. 12, 1986

[54] LOCKING ARM LAMP SWIVEL

[75] Inventor: Louis D. Pike, Moreland Hills, Ohio

[73] Assignee: Pike Machine Products Company, Cleveland, Ohio

[21] Appl. No.: 712,187

[22] Filed: Mar. 15, 1985

[51] Int. Cl.$^4$ ............................................. F21V 21/26
[52] U.S. Cl. .................................. 362/287; 362/370; 362/427; 362/432
[58] Field of Search .............. 362/145, 147, 270, 285, 362/287, 368, 370, 371, 417, 418, 419, 422, 427, 432, 430, 431; 248/284

[56] References Cited

U.S. PATENT DOCUMENTS

| | | | |
|---|---|---|---|
| 291,171 | 1/1884 | Edmunds | 362/432 |
| 1,340,273 | 5/1920 | Jones | 362/127 |
| 2,365,031 | 12/1944 | Wickens | 411/263 |
| 3,066,219 | 11/1962 | Duddy | 362/427 |
| 3,322,886 | 5/1967 | Warshawsky | 174/86 |
| 3,576,988 | 5/1971 | Henning | 362/427 |
| 4,386,393 | 5/1983 | Pike | 362/427 |
| 4,449,172 | 5/1984 | Warshawsky | 362/285 |
| 4,459,650 | 7/1984 | Pike | 362/427 |

Primary Examiner—Charles J. Myhre
Assistant Examiner—David A. Okonsky
Attorney, Agent, or Firm—Fay, Sharpe, Fagan, Minnich & McKee

[57] ABSTRACT

A swivel assembly includes a first swivel member, a second swivel member, and a third swivel member. A first mounting member has a first end which is received in a first bore in the first swivel member in engagement with a first stop. The first mounting member defines a shoulder which engages a mounting surface. A like mounting member is received in a bore of the third swivel member in engagement with a stop. The relative position of the shoulders of each of the two mounting members is fixed by the position of the stops and the length between the mounting member first end and shoulder. An arm extends from the second member such that the arm and second member swivel about the first and third members. A fixed member extends from the first swivel member and receives a locking member therein. The locking member selectively moves vertically into and out of engagement with a locking member receiving recess in the arm. In this manner, the arm may be selectively locked in a fixed position, such as when the lamp assembly is mounted in a moving vehicle, and may be selectively unlocked to allow the arm and a lamp supported thereon to be freely positioned.

17 Claims, 3 Drawing Figures

LOCKING ARM LAMP SWIVEL

BACKGROUND OF THE INVENTION

The present invention pertains to the art of swivel joints. It finds particular application in conjunction with swivel joints for supporting swiveling lamp arms and will be described with particular reference thereto. It is to be appreciated, however, that the invention is also applicable to other pivotal connections and joints. The invention will find utility in pivotally connecting members for other purposes such as fluid carrying members, structural members for supporting decorative and functional appliances, such as shaving mirrors, candle sconces, and the like.

Heretofore, wall mounted swivel lamps were commonly free to undergo swiveling rotation in a wide arc. Although rotation limiting structures have been used to limit the arm from swiveling around and around twisting the wire passing therethrough, it was considered advantageous for the arms to rotate a full 360°. See, for example, U.S. Pat. No. 4,386,393 issued May 31, 1983 to the inventor herein.

The 360° swiveling arms were relatively successful, particularly in areas where illumination was desired but floor and table space were limited. However, swivel lamps have found little acceptance in the confined living areas of recreational vehicles, boats, trailers, and the like. The freely movable arms were apt to swing during acceleration, braking, hills, and the like causing damage to the supported light fixture.

The prior art swivel lamps were commonly mounted to a box or other supporting surface with a pair of threaded nipples as illustrated in U.S. Pat. No. 4,459,650 issued July 10, 1984 to the inventor herein. Washers were placed between the swivel and the supporting surface to prevent binding. At one end, the threaded nipples were threaded into tapped threads in the relatively thin side walls of the swivel members. The other end received a nut or similar retaining member. The relatively small cross section of available thread in the swivel member limited the strength in this mounting arrangement. Moreover, the nipples tended to shift in the holes of the mounting surface moving the swivel lamp arm out of a vertical plane.

In recreational vehicles and other moving structures, it is desirable to increase the mounting strength to resist acceleration and braking forces. Moreover, the vibration associated with a moving structure tends to accelerate the tendency for the lamp assembly to become crooked.

The present invention contemplates a new and improved swivel lamp assembly which overcomes the above-referenced problems and others.

SUMMARY OF THE INVENTION

In accordance with one aspect of the present invention, a wall mountable lamp assembly is provided. At least, first and second swivel members are rotatably interconnected to undergo rotating movement about a swivel axis. A wall mounting means fixedly mounts the first swivel member to a supporting surface. An arm for supporting the lighting fixture is mounted to the second swivel member such that the arm swivels relative to the supporting surface about the swivel axis. An arm locking means selectively locks the arm in a fixed position relative to the supporting surface and against swiveling about the swivel axis. In this manner, the locking mechanism may be released to position the arm and the lighting fixture when the recreational vehicle is stopped and locked while the recreational vehicle is moving to stop the lighting fixture from moving.

In accordance with another aspect of the present invention, the wall mountable lamp assembly includes at least first and second swivel members. The first swivel member defines a bore through a peripheral wall thereof in communication with an internal wire receiving passage. A stop projects into the bore to reduce its cross sectional area. A cylindrical mounting member defines a first end which is received in the peripheral wall bore in engagement with the stop. A mounting member shoulder is disposed a preselected length from the swivel member when the mounting member is brazed or otherwise affixed in the bore abutting the shoulder. In this manner, the stop and shoulder define the mounting position of the first swivel member relative to a mounting surface. A lighting fixture supporting arm is operatively connected with the second swivel member to swivel the supported fixture relative to the supporting surface.

A primary advantage of the present invention is that it facilitates mounting of swivel lamps in recreational vehicles and other movable structures.

Another advantage of the present invention is that it strengthens the mounting structure and resists skewing or tipping of the mounted swivel.

Another advantage of the present invention is that it permits the position of the swiveled arm to be selectively locked.

Yet another advantage of the present invention is that it facilitates threading an electrical wire therethrough, yet inhibits wire damage.

Still further advantages will become apparent upon reading and understanding the following detailed description of the preferred embodiments.

BRIEF DESCRIPTION OF THE DRAWINGS

The invention may be embodied in various parts and arrangements of parts. The drawings are only for purposes of illustrating preferred embodiments of the invention and are not to be construed as limiting it.

DETAILED DESCRIPTION OF THE PREFERRED EMBODIMENTS

Figure 1:
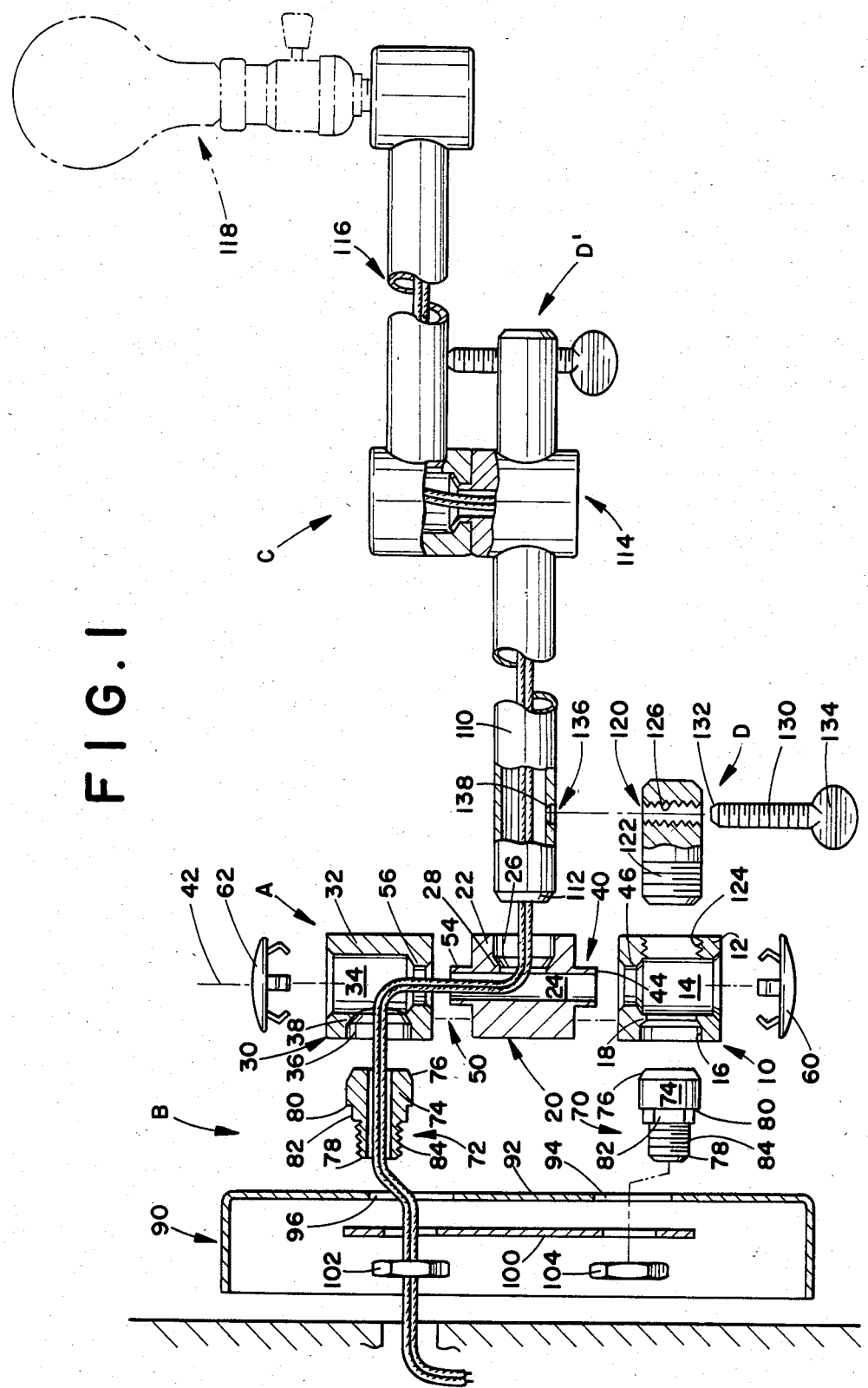
FIG. 1 is an exploded view in partial section of a wall mountable swivel lamp assembly.

With reference to FIG. 1, the swivel arm lamp assembly includes a swivel A. A mounting means B fixedly mounts the swivel assembly A to a wall or other supporting surface in a preselected, normally vertical alignment therewith. An arm assembly C extends horizontally from the swivel assembly A to a lighting fixture or other supported structure. The swivel enables the arm assembly to be swiveled in a horizontal plane relative to the mounting surface. An arm locking means D enables the angular position of the arm to be locked against swiveling.

The swivel assembly A includes a first swivel member 10. The first swivel member includes a first peripheral wall 12 which defines a first wire receiving passage 14 axially therein. A first peripheral wall bore 16 extends transversely through the first peripheral wall in communication with the wire receiving passage. A first stop 18, preferably an annular shoulder, is defined at the inner end of the first bore adjacent the first wire receiving passage.

A second swivel member 20 includes a peripheral wall 22 which defines a second wire receiving passage 24 extending axially therein. A second peripheral wall bore 26 extends transversely through the second peripheral wall in communication with the second wire receiving passage. A second stop or shoulder 28 provides a reduced cross sectional passage at the inner end of the second bore to limit the receipt of structures therein.

A third swivel member 30 includes a third peripheral wall 32 which defines a third wire receiving passage 34 axially therein. A third bore 36 extends transversely through the third peripheral wall in communication with the third wire receiving passage. A third stop or shoulder 38 defines a reduced cross section passage at the inner end of the third bore adjacent the third wire receiving passage.

The first and second swivel members are rotatably connected by a rotatable interconnection 40 such that the first and second swivel members swivel or rotate about a vertical swivel axis 42. In the preferred embodiment, the first swivel mounting includes a flange 44 which is selectively crimped around a collar 46. The crimping pressure determines the drag or amount of resistance to swiveling. A second rotatable interconnection 50 rotatably interconnects the second and third swivel members for rotation about the swivel axis 42. The second rotatable interconnection preferably includes a flange 54 which is selectively crimped around a shoulder 56. A pair of end caps 60, 62 selectively close the ends of the first swivel member 10 and the third swivel member 30.

With continuing reference to FIG. 1, the wall mounting means B includes a first mounting member 70 for mounting the first swivel member 10 and a second mounting member 72 for mounting the third swivel member to a supporting surface. Because both mounting members are identical, it is to be appreciated that the following description applies equally to both. Each mounting member includes a first end cylindrical portion 74 which is dimensioned to be received snugly in one of the peripheral wall bores. Preferably, the mounting member is brazed to the peripheral wall. The mounting member cylindrical portion terminates in a first or inner end 76 which abuts the corresponding stop to limit receipt of the mounting member into the bore. The stop prevents the mounting member from being passed into the wire receiving passage to obstruct threading wire therethrough and from providing a corner that might cut the wire.

Toward a second end 78, the cylindrical portion defines a shoulder 80. The stop 18, 38 and the length of the mounting member between its first end 76 and the shoulder 80 define the location of the shoulder 80 relative to the swivel assembly A. This assures precise positioning of the swivel relative to a supporting structure. An anti-skewing guide portion 82 is disposed between the shoulder 80 and a threaded segment 84 extending to the second end 78.

Figure 2:
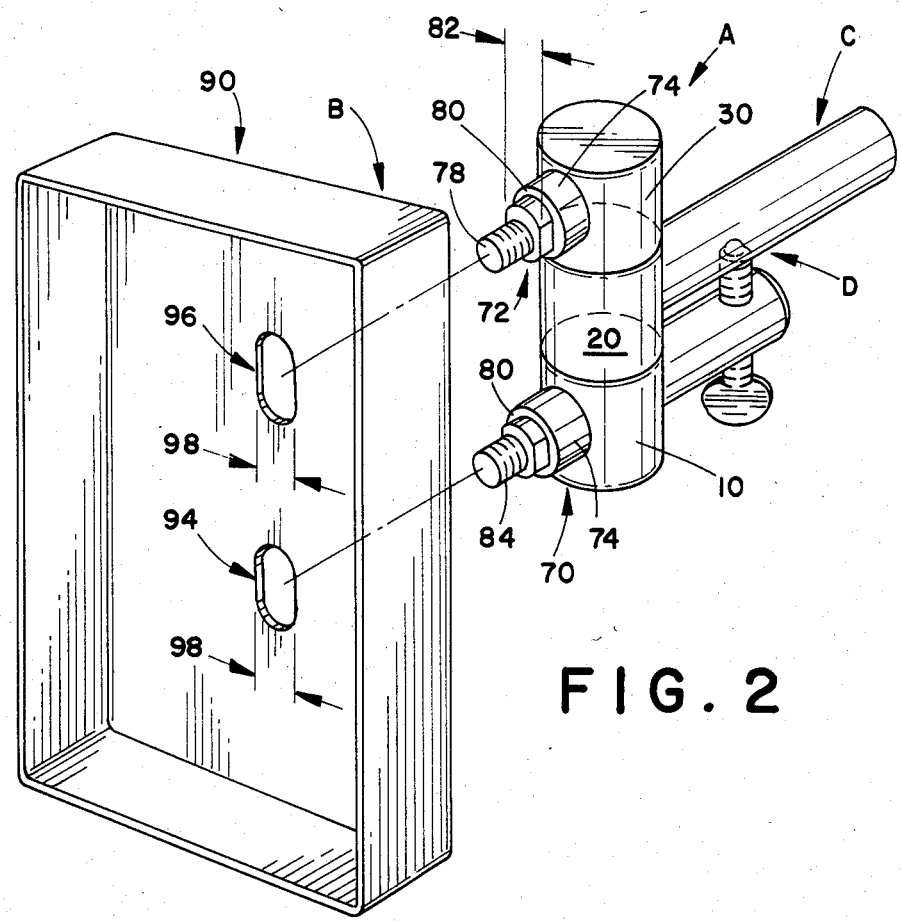
FIG. 2 is a detailed view illustrating interaction between the swivel mounting assembly and the supporting surface; and, FIG. 3 is a view in partial section of an alternate embodiment of the locking mechanism of FIG. 1.

With continuing reference to FIG. 1 and further reference to FIG. 2, a wall mounting box 90 has a mounting surface 92 and defines a pair of apertures 94, 96 therein. The mounting box apertures each define a minor axis 98 extending horizontally which is the same dimension as the horizontal dimension of the anti-skewing guide portion 82 of the mounting members 70, 72. The apertures further define a major axis in the vertical direction which is longer than the minor dimension. In this manner, the frictional interaction between the guide portions 82 of the mounting members and the sides of the mounting surface apertures 94, 96 prevent the swivel assembly from tipping or skewing relative thereto. Yet, the larger vertical dimension facilitates mounting of the swivel when the vertical positions of the mounting members vary due to changes in the degree of crimping between the swivel members and other variations in the vertical tolerance.

Referring again to FIG. 1, a reinforcing plate 100 is mounted behind the mounting surface 92 to provide increased strength. A pair of nuts 102, 104 engage the threaded portions 84 of the mounting members to lock the shoulders 80 firmly against the mounting surface 92. Optionally, other mounting means for connecting the mounting members to the mounting box 90 may be used.

The arm assembly C includes a first arm 110 which has a first end 112 that abuts the second stop 28. This prevents the arm from being inserted through the second peripheral wall into the second wire receiving passage partially obstructing it making threading of a wire therethrough more difficult. A second end of the first arm 110 is connected with a second swivel 114. A second arm 116 extends from a second swivel 114 to a lighting fixture 118. A wire receiving passage extends from the first swivel A through the first arm 110, the second swivel 114, and the second arm 116 to the fixture.

With continuing reference to FIG. 1, the locking means D includes a fixed, stub member 120 which is threaded at an inner end 122 to be received in a threaded bore 124 of the first or third swivel members. The locking means mounting bore 124 is of the same diameter as the passage through the first stop means or collar 18 such that both may be drilled in the same operation. The fixed member 120 defines a threaded bore 126 for receiving a locking member 130. The locking member includes a tapered arm engaging end 132 and a manual grasping portion 134. The first arm 110 defines a recess 136 therein for receiving the tapered end of the locking member. The first arm recess 136 is preferably a bore with a stop means or collar 138 for preventing the locking member tapered end from passing into a wire receiving passage through the first arm. In this manner, the locking member is prevented from clamping and rupturing an electrical wire disposed within the first arm.

In a two arm arrangement, a second locking mechanism D' is provided to lock the first arm 110 and the second arm 116 against swiveling movement. Optionally, other locking mechanisms may be provided. For example, fixed member 120 may be mounted to the first swivel member offset from the axis of the mounting member 70 such that the arm is locked to one side.

Figure 3:
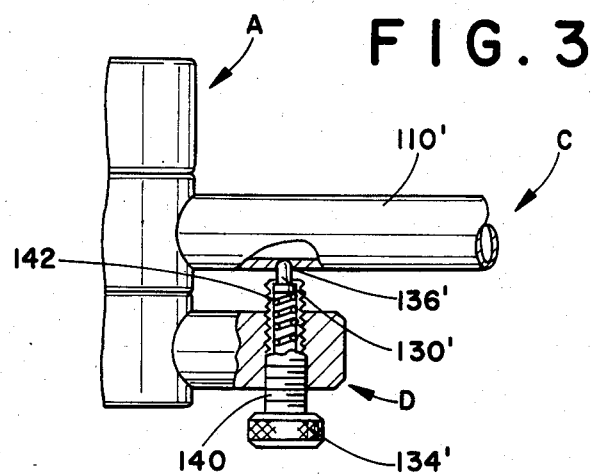

FIG. 3 illustrates an alternate embodiment of the locking mechanism in which the elements are denoted by the same reference numerals as like elements in FIG. 1 but followed by a prime ('). A first arm 110' having a recess 136' and a fixed member 120' are mounted to a swivel assembly A. A locking member 130' is spring biased to engage the recess 136' of the arm. More specifically, the locking member is mounted on a threaded cylinder 140 which receives a biasing spring 142 therein. A manually graspable member 134' is connected with the threaded cylinder 140' to adjust the relative position of the locking member 130' and the first arm 110', hence the degree of frictional engagement. In this embodiment, the exterior surface of the tubular arm acts as a camming surface to cam the locking member down as the arm swings theretoward. Under the urging of the spring 142, the locking member passes into the recess 136' becoming locked therein. In this manner, the locking mechanism is self-locking to lock the arm against swiveling automatically, without human assistance.

The invention has been described with reference to the preferred embodiments. Obviously, modifications and alterations will occur to others upon reading and understanding the preceeding specification. It is intended that the invention be construed as including all such alterations and modifications in so far as they come within the scope of the appended claims and the equivalents thereof.

Having thus described the preferred embodiments, the invention is now claimed to be:

1. A wall mountable lockable arm assembly for supporting a lighting fixture, the assembly comprising:
   a first swivel member;
   a second swivel member rotatably connected to the first swivel member to undergo rotating movement relative thereto about a swivel axis;
   a mounting means for fixedly mounting the first swivel member to a supporting surface;
   an arm mounted to the second swivel member such that the arm swivels relative to the supporting surface about the swivel axis, the arm being interconnectable with the lighting fixture;
   a fixed member fixedly connected with the first swivel member in a preselected relationship to the supporting surface;
   an interconnecting means for selectively interconnecting the fixed member and the arm to lock the arm relative thereto.

2. The assembly as set forth in claim 1 wherein the interconnecting means includes a locking member which is selectively received in a locking member receiving recess of the arm.

3. The arm assembly as set forth in claim 2 wherein the locking member is a spring biased into engagement with the arm recess to lock the arm against swiveling.

4. The assembly as set forth in claim 1 wherein the interconnecting means includes:
   a threaded bore in one of the fixed member and the arm; and,
   a locking member threadedly received in the threaded bore for selectively engaging the other of the fixed member and the arm.

5. The assembly as set forth in claim 4 wherein the arm defines an aperture which selectively receives the locking member and further including a blocking means for blocking the locking member from passing into an interior passage of the arm and engaging an electric wire passing therethrough.

6. The assembly as set forth in claim 2 wherein the first swivel member includes:
   a peripheral wall defining a wire receiving passage therein;
   a bore extending through the peripheral wall into the wire receiving passage, the wire mounting means being received in the peripheral wall bore; and,
   a stop extending into the peripheral wall bore adjacent the wire receiving passage to define a restricted cross section portion of the peripheral wall bore to limit receipt of the wall mounting means.

7. The assembly as set forth in claim 6 wherein the wall mounting means includes:
   a mounting member which is dimensioned at a first end to be received in the peripheral wall bore and engage the stop, and which defines a mounting surface engaging shoulder between the first end and a second end.

8. The assembly as set forth in claim 7 further including:
   a third swivel member rotatably connected with the second swivel member, the third swivel member including a third member peripheral wall, a third member bore extending through the third member peripheral wall, and a third member stop extending into the third member peripheral wall bore; and,
   another mounting member which is dimensioned at a first end thereof to be received in the third member peripheral wall bore and engage the third member stop therein and which defines a mounting surface engaging second shoulder between the first end and a second end thereof.

9. A wall mountable arm assembly for supporting a lighting fixture with improved resistance to skewing, the arm assembly comprising:
   (a) a wall mounting surface defining first and second apertures in a preselected spaced and oriented relationship;
   (b) a first swivel member including:
       (i) a first peripheral wall;
       (ii) a first bore defined in the first peripheral wall,
       (iii) a first wire receiving passage defined within the first peripheral wall in communication with the first peripheral wall bore, and
       (iv) a first stop which reduces a cross section of the first peripheral wall bore adjacent the wire receiving passage;
   (c) a second swivel member rotatably connected to the first swivel member, the second swivel member having wire receiving passage defined therein in communication with the first swivel member wire receiving passage;
   (d) an arm connected with the second swivel member and operatively connectable with the lighting fixture, the arm defining a wire receiving passage in communication with the second swivel member wire receiving passage,
   (e) a third swivel member rotatably connected with the second swivel member, the third swivel member including:
       (i) a third peripheral wall,
       (ii) a third bore in the third peripheral wall, and
       (iii) a third stop which reduces a cross section of the third peripheral wall bore;
   (f) a first mounting member including:
       (i) a first end received in the first peripheral wall bore in engagement with the first stop, and
       (ii) a second end which extends through the first mounting surface aperture,
       (iii) a shoulder which engages the mounting surface adjacent the first aperture, the shoulder being disposed a preselected length from the first end such that the first stop and shoulder fix the position of the first swivel member relative to the mounting surface, (g) a second mounting member including:
  (i) a first end received in the third peripheral wall bore in engagement with the third stop,
  (ii) a second end which extends through the second mounting surface aperture, and
  (iii) a second shoulder disposed said preselected length from its first end, and engaging the mounting surface adjacent the second aperture such that the second stop and shoulder fix the position of the third swivel member relative to the mounting surface;
wherein the first and second mounting members fix the orientation and position of the connected first, second, and third swivel members relative to the mounting surface; and,
(h) a connecting means for connecting the second ends of the first and second mounting members with the mounting surface.

10. The assembly as set forth in claim 9 wherein the first and second mounting members are brazed into the first and second bores, respectively.

11. The assembly as set forth in claim 9 wherein the first and second mounting members each define an antiskewing guide portion adjacent the shoulders having a preselected width and wherein the mounting surface apertures each have said preselected width, at least one of the mounting surface apertures defining a length longer than the preselected width, wherein the swivel assembly is prevented from skewing in the mounting surface apertures.

12. The assembly as set forth in claim 9 further including locking means for selectively locking the arm against swiveling relative to the mounting surface.

13. The assembly as set forth in claim 12 wherein the locking means includes:
a fixed member mounted to one of the first and third swivel members; and,
a locking member operatively supported by the fixed member for movement generally transverse thereto selectively into engagement with a recess in the arm.

14. The assembly as set forth in claim 13 further including a wire extending through the first mounting member, the first swivel member wire receiving passage, the second swivel member wire receiving passage, the arm wire receiving passage, and operatively connected with the lighting fixture.

15. A swivel arm assembly comprising:
(a) a first swivel member including:
  (i) a first peripheral wall,
  (ii) a first bore defined in the first peripheral wall,
  (iii) a first stop which reduces a cross section of the first peripheral wall bore;
(b) a second swivel member rotatably connected to the first swivel member;
(c) a third swivel member including:
  (i) a third peripheral wall,
  (ii) a third bore defined in the third peripheral wall,
  (iii) a third stop which reduces a cross section of the third peripheral wall bore;
(d) a first mounting member including:
  (i) a first mounting member inner end received in the first peripheral wall bore in engagement with the first stop,
  (ii) a first shoulder for selectively engaging a mounting surface and disposed a preselected length from the first mounting member inner end such that the first stop and the preselected length fix the position of the first shoulder;
(e) a second mounting member including:
  (i) a second mounting member inner end received in the third peripheral wall bore in engagement with the third stop,
  (ii) a second shoulder for engaging the mounting surface and disposed the preselected length from the second mounting member inner end such that the third stop and the preselected length fix the position of the shoulder;
(f) an arm mounted to the second swivel member such that the arm swivels relative to the supporting surface;
(g) a fixed member connected with the first swivel member; and,
(h) a locking member operatively supported by the fixed member for selective movement into and out of engagement with the arm for selectively locking the arm against swiveling.

16. A wall mountable lockable arm assembly for supporting a light fixture, the assembly comprising:
a first, hollow swivel member fixedly connected with an associated structure;
a second, hollow swivel member rotatably connected to the first swivel member to undergo rotating movement relative thereto about a swivel axis;
a hollow arm for supporting the lighting fixture adjacent a first end thereof, the arm being mounted adjacent a second end thereof to the second swivel member such that the arm swivels relative to the associated structure about the swivel axis, the first and second hollow swivel members, the associated structure, and the hollow arm being interconnected such that a wire receiving passage is defined between the associate structure and the lighting fixture, the arm including a locking member receiving means;
a fixed member fixedly connected with the first swivel member in a preselected relationship therewith, the fixed member having a threaded bore therein; and,
a locking member threadedly received in the threaded bore for selective receipt in the locking member receiving means of the arm for fixing the arm relative to the associated structure.

17. A wall mountable arm assembly for supporting a lighting fixture, the assembly comprising:
first, second, and third swivel members which are rotatably connected for rotation about a common swivel axis, the second swivel member being rotatably connected at one end with the first swivel member and being rotatably connected at another end with the third swivel member;
a mounting plate having first and second apertures therethrough, the mounting plate being mountable to a vertical surface with the first and second apertures disposed in vertical alignment;
a first mounting member permanently connected to the first swivel member and extending perpendicular to the swivel axis, the first mounting member defining a first shoulder a preselected distance from the swivel axis and a first reduced diameter portion extending outward beyond the first shoulder, the first reduced diameter portion extending through the first mounting plate aperture and the first shoulder abutting an outer surface of the mounting plate;
a second mounting member permanently connected to the third swivel member and extending outward therefrom in a direction perpendicular to the swivel axis, the second mounting member defining a second shoulder said preselected distance from the swivel axis and a second reduced diameter portion extending outward beyond the second shoulder, the second reduced diameter portion being received in the second mounting plate aperture and the second shoulder abutting the mounting plate outer surface, wherein the first and second mounting members and the first and second shoulders thereof fix the swivel axis in alignment with the vertically oriented first and second apertures; and, an arm mounted to the second swivel member such that the arm swivels about said common axis, said arm being operatively connectable with the lighting fixture.

* * * * *